United States Patent
Togahara

(10) Patent No.: US 8,533,207 B2
(45) Date of Patent: Sep. 10, 2013

(54) INFORMATION PROCESSING METHOD, APPARATUS AND PROGRAM IN XML DRIVEN ARCHITECTURE

(75) Inventor: Nobuo Togahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 805 days.

(21) Appl. No.: 12/323,049

(22) Filed: Nov. 25, 2008

(65) Prior Publication Data

US 2009/0083335 A1 Mar. 26, 2009

Related U.S. Application Data

(62) Division of application No. 10/800,122, filed on Mar. 12, 2004, now Pat. No. 7,469,258.

(30) Foreign Application Priority Data

Jul. 31, 2003 (JP) ................................. 2003-283314
Feb. 2, 2004 (JP) ................................. 2004-025677

(51) Int. Cl.
 *G06F 17/30* (2006.01)
 *G06F 7/00* (2006.01)

(52) U.S. Cl.
 USPC .......................................... 707/755; 707/802

(58) Field of Classification Search
 USPC ......................................................... 707/755
 See application file for complete search history.

(56) References Cited

U.S. PATENT DOCUMENTS

| | | | | |
|---|---|---|---|---|
| 5,933,634 | A | 8/1999 | Enokido et al. | 395/701 |
| 6,569,207 | B1 | 5/2003 | Sundaresan | |
| 6,938,079 | B1 * | 8/2005 | Anderson et al. | 709/222 |

(Continued)

FOREIGN PATENT DOCUMENTS

| | | |
|---|---|---|
| JP | 04-184627 | 7/1992 |
| JP | A 8-63351 | 3/1996 |

(Continued)

OTHER PUBLICATIONS

Struts, The Jakarta Project, Apache Software Foundation, 2000-2001.*

Struts, The Apache Jakarta Project, Apache Software Foundation, Internet Disclosure, pp. 1-56, 2000-2003, http:/jakarta.apache.org/.

(Continued)

*Primary Examiner* — Kuen Lu
(74) *Attorney, Agent, or Firm* — Greer, Burns & Crain, Ltd.

(57) ABSTRACT

This invention relates to the development of a business program in an XML driven architecture. First, XML data corresponding to a form screen is analyzed and a business class corresponding to a tag included in the XML data is specified. Then, by referring to a business class manager in which the business classes to be created are registered, it is judged whether or not the specified business class has not been registered in the business class manager, and if the specified business class has not been registered in the business class manager, the specified business class is registered in the business class manager. After this, each of the business classes has to be specifically programmed. On the other hand, at the execution time of the programmed business classes, XML data including tags corresponding to data inputted or selected for the form screen is obtained, and the business classes that correspond to the tags included in the XML data and are programs to carry out a processing relating to the tags. Then, the specified business classes are called among the business classes that are defined in advance and loaded in a memory.

9 Claims, 14 Drawing Sheets

(56) References Cited

U.S. PATENT DOCUMENTS

| | | | |
|---|---|---|---|
| 2002/0138582 A1* | 9/2002 | Chandra et al. | 709/206 |
| 2002/0144248 A1* | 10/2002 | Forbes et al. | 717/167 |
| 2003/0014441 A1* | 1/2003 | Suzuki et al. | 707/513 |
| 2003/0060896 A9* | 3/2003 | Hulai et al. | 700/1 |
| 2003/0149934 A1* | 8/2003 | Worden | 715/513 |
| 2003/0233249 A1* | 12/2003 | Walsh et al. | 705/1 |
| 2004/0006527 A1* | 1/2004 | Petersen et al. | 705/37 |
| 2004/0059834 A1* | 3/2004 | Taylor et al. | 709/247 |

FOREIGN PATENT DOCUMENTS

| | | |
|---|---|---|
| JP | 08-249170 | 9/1996 |
| JP | 2001-034461 | 2/2001 |
| JP | A 2001-188673 | 7/2001 |
| JP | 2001-312401 | 11/2001 |
| JP | A 2002-312219 | 10/2002 |
| JP | 2003-108369 | 4/2003 |
| WO | WO 00/67176 | 11/2000 |
| WO | WO 02/063438 | 8/2002 |
| WO | WO 03/009071 A1 | 1/2003 |

OTHER PUBLICATIONS

Tarau, V., *A Framework for Automatic Generation of Web-Based Data Entry Applications Based on XML*, Proceedings of the 2002 ACM Symposium on Applied Computing, Mar. 11-14, 2002, Madrid, Spain, pp. 1121-1126.

Kim, L., *XMLSPY Now Available*, Internet Disclosure (Article from Newsgroup Comp.Text.Xml, Sep. 20, 2002, pp. 1-2.

Roth, M., Pelegri-Llopart, E., *JavaServer Pages Specification—Version 2.0, Public Draft*, Internet Disclosure, Jun. 18, 2002, pp. i-xx, 2-41-2-92.

Faico Information Solutions, *DiDaPro HTML Editor*, Internet Disclosure, Feb. 1, 2003, pp. 1-2.

Suzuki Daichi, "Data Structure learned by trying, Algorithm understood by using, This is Java API Laboratory!" JAVA PRESS, vol. 30, pp. 175-185, Jun. 15, 2003; Gijutsu-Hyohron Col., Ltd.

Koutaro, Learning through catalogs—Perfect conquest of Jakarta Commons, WEB+DB Press, vol. 15, Gijutsu-Hyohron Co., Ltd., Jul. 25, 2003.

Interrogation issued by the Japanese Patent Office in Japanese App. No. 2009-162332, dated Apr. 9, 2013 (with translation).

* cited by examiner

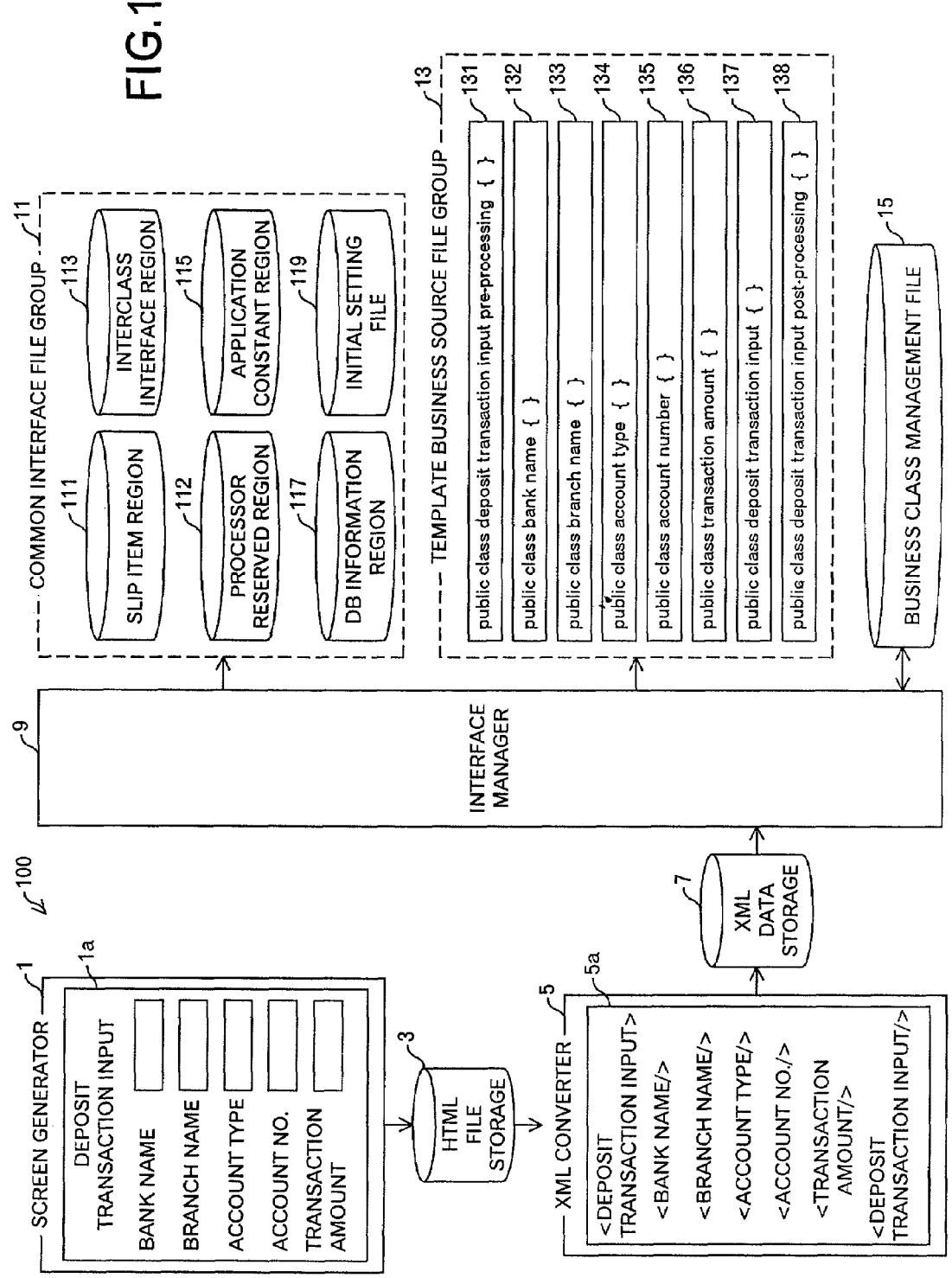

```
<?xml version="1.0" encoding="Shift_JIS"?>
-<RESOURCE MANAGEMENT> .
  -<OBJECT POOL>
    +<PROCESSOR RESERVED REGION>
    -<SLIP ITEM REGION>
       <DEPOSIT TRANSACTION INPUT ROUTE JUDGMENT="ROUTE" REGISTERED DATE
       AND TIME="2003/7/23 10:54:40"/>
       <TRANSACTION AMOUNT REGISTERED DATE AND TIME="2003/7/23 10:54:40"/>
       <ACCOUNT NUMBER REGISTERED DATE AND TIME="2003/7/23 10:54:40"/>
       <ACCOUNT TYPE REGISTERED DATE AND TIME="2003/7/23 10:54:40"/>
       <BRANCH NAME REGISTERED DATE AND TIME="2003/7/23 10:54:40"/>
       <BANK NAME REGISTERED DATE AND TIME="2003/7/23 10:54:40"/>
    </SLIP ITEM REGION>
    <DB INFORMATION REGION/>
    <APPLICATION CONSTANT ITEM REGION/>
    +<INTERCLASS INTERFACE ITEM REGION>
  </OBJECT POOL>
  -<TEMPLATE BUSINESS CLASS>
     <USR_TRANSACTION AMOUNT REGISTERED DATE AND TIME="2003/7/23 10:54:40"/>
     <USR_ACCOUNT NUMBER REGISTERED DATE AND TIME="2003/7/23 10:54:40"/>
     <USR_ACCOUNT TYPE REGISTERED DATE AND TIME="2003/7/23 10:54:40"/>
     <USR_BRANCH NAME REGISTERED DATE AND TIME="2003/7/23 10:54:40"/>
     <USR_BANK NAME REGISTERED DATE AND TIME="2003/7/23 10:54:40"/>
     <USR_DEPOSIT TRANSACTION INPUT PRE-PROCESSING REGISTERED DATE AND
     TIME="2003/7/23 10:54:40"/>
     <USR_DEPOSIT TRANSACTION INPUT POST-PROCESSING REGISTERED DATE AND
     TIME="2003/7/23 10:54:40"/>
     <USR_DEPOSIT TRANSACTION INPUT REGISTERED DATE AND TIME="2003/7/23 10:54:40"/>
  </TEMPLATE BUSINESS CLASS>
</RESOURCE MANAGEMENT>
```

| OBJECT POOL INSTANCE VARIABLE.getValue(SLIP ITEM NAME, ARRAY NO.) |
|---|
| OBJECT POOL INSTANCE VARIABLE.getDBValue(DB ITEM NAME, ARRAY NO.) |
| OBJECT POOL INSTANCE VARIABLE.getAphandleValue(INTERCLASS INTERFACE ITEM NAME, ARRAY NO.) |
| OBJECT POOL INSTANCE VALIAVLE.getApconstValue(APPLICATION CONTANT ITEM NAME, ARRAY NO.) |
| OBJECT POOL INSTANCE VARIABLE.getProcessorValue(PROCESSOR RESERVED ITEM NAME, ARRAY NO.) |

FIG.5B

| OBJECT POOL INSTANCE VARIABLE.setValue(SLIP ITEM NAME, DATA) |
|---|
| OBJECT POOL INSTANCE VARIABLE.setDBValue(DB ITEM NAME, DATA) |
| OBJECT POOL INSTANCE VARIABLE.setAphandleValue(INTERCLASS INTERFACE ITEM NAME, DATA) |
| OBJECT POOL INSTANCE VALIAVLE.setApconstValue(APPLICATION CONTANT ITEM NAME, DATA) |
| OBJECT POOL INSTANCE VARIABLE.setProcessorValue(PROCESSOR RESERVED ITEM NAME, DATA) |

FIG.5C

| OBJECT POOL INSTANCE VARIABLE.getError(SLIP ITEM NAME, ARRAY NO.) |
|---|
| OBJECT POOL INSTANCE VARIABLE.getDBError(DB ITEM NAME, ARRAY NO.) |
| OBJECT POOL INSTANCE VARIABLE.getAphandleError(INTERCLASS INTERFACE ITEM NAME, ARRAY NO.) |
| OBJECT POOL INSTANCE VALIAVLE.getApconstError(APPLICATION CONTANT ITEM NAME, ARRAY NO.) |
| OBJECT POOL INSTANCE VARIABLE.getProcessorError(PROCESSOR RESERVED ITEM NAME, ARRAY NO.) |

FIG.5D

| OBJECT POOL INSTANCE VARIABLE.setError(SLIP ITEM NAME, DATA) |
|---|
| OBJECT POOL INSTANCE VARIABLE.setDBError(DB ITEM NAME, DATA) |
| OBJECT POOL INSTANCE VARIABLE.setAphandleError(INTERCLASS INTERFACE ITEM NAME, DATA) |
| OBJECT POOL INSTANCE VALIAVLE.setApconstError(APPLICATION CONTANT ITEM NAME, DATA) |
| OBJECT POOL INSTANCE VARIABLE.setProcessorError(PROCESSOR RESERVED ITEM NAME, DATA) |

FIG.5E

| OBJECT POOL INSTANCE VARIABLE.getSize(SLIP ITEM NAME) |
|---|
| OBJECT POOL INSTANCE VARIABLE.getDBSize(DB ITEM NAME) |
| OBJECT POOL INSTANCE VARIABLE.getAphandleSize(INTERCLASS INTERFACE ITEM NAME) |
| OBJECT POOL INSTANCE VALIAVLE.getApconstSize(APPLICATION CONTANT ITEM NAME) |
| OBJECT POOL INSTANCE VARIABLE.getProcessorSize(PROCESSOR RESERVED ITEM NAME) |

FIG.5F

OBJECT POOL INSTANCE VARIABLE.clearValue(SLIP ITEM NAME)
OBJECT POOL INSTANCE VARIABLE.clearDBValue(DB ITEM NAME)
OBJECT POOL INSTANCE VARIABLE.clearAphandleValue(INTERCLASS INTERFACE ITEM NAME)
OBJECT POOL INSTANCE VALIAVLE.clearApconstValue(APPLICATION CONTANT ITEM NAME)
OBJECT POOL INSTANCE VARIABLE.clearProcessorValue(PROCESSOR RESERVED ITEM NAME)

FIG.5G

OBJECT POOL INSTANCE VARIABLE.getAttributeVal(SLIP ITEM NAME, ARRAY NO., ATTRIBUTE NAME)

FIG.5H

OBJECT POOL INSTANCE VARIABLE.setAttributeVal(SLIP ITEM NAME, ARRAY NO., ATTRIBUTE NAME, ATTRIBUTE VALUE)

DEPOSIT TRANSACTION (INPUT)
- BANK NAME: ○○○ — 601
- BRANCH NAME: × × × — 602
- ACCOUNT TYPE: ● NORMAL  ○ FIXED  ○ CURRENT — 603
- ACCOUNT NO.: 12345678 — 604
- TRANSACTION AMOUNT: 10000 — 605
- CONFIRM — 606
- RETURN — 607

FIG.8

```
<DEPOSIT TRANSACTION INPUT>
  <BANK NAME>200</BANK NAME>
  <BRANCH NAME>121</BRANCH NAME>
  <ACCOUNT TYPE>01</ACCOUNT TYPE>
  <ACCOUNT NO.>12345678</ACCOUNT NO.>
  <TRANSACTION AMOUNT>10000</TRANSACTION AMOUNT>
</DEPOSIT TRANSACTION INPUT>
```

FIG.9

```
<?xsl: stylesheet···OUTPUT_SCREEN.xsl?>
<DEPOSIT TRANSACTION RESULT>
  <HANDLING DATE>FEB. 12, 2003</HANDLING DATE>
  <TIME>11:20</TIME>
  <BANK NAME>○○○</BANK NAME>
  <BRANCH NAME>×××</BRANCH NAME>
  <ACCOUNT TYPE>NORMAL</ACCOUNT TYPE>
  <ACCOUNT NO.>12345678</ACCOUNT NO.>
  <TRANSACTION AMOUNT>10000</TRANSACTION AMOUNT>
  <COMMISSION>0</COMMISSION>
  <TOTAL AMOUNT>10000</TOTAL AMOUNT>
  <BALANCE>50000</BALANCE>
  <HANDLING BRANCH NO.>360</HANDLING BRANCH NO.>
  <HANDLING BRANCH NAME>△△△</HANDLING BRANCH NAME>
</DEPOSIT TRANSACTION RESULT>
```

FIG.12

| DEPOSIT TRANSACTION RESULT | |
|---|---|
| HANDLING DATE: 2003/2/12 | TIME: 11:20 |
| BANK NAME: ○○○ | BRANCH NAME: ××× |
| ACCOUNT TYPE: NORMAL | ACCOUNT NO.: 12345678 |
| TRANSACTION AMOUNT: 10000 | COMMISSION: 0 |
| TOTAL AMOUNT: 10000 | BALANCE: 50000 |
| HANDLING BRANCH NO.: 360 | HANDLING BRANCH NAME: △△△ |
| [CONFIRM] 1301 | [INITIAL SCREEN] 1302 |

FIG.13

INFORMATION PROCESSING METHOD, APPARATUS AND PROGRAM IN XML DRIVEN ARCHITECTURE

TECHNICAL FIELD OF THE INVENTION

This application is a Divisional of application Ser. No. 10/800,122, filed Mar. 12, 2004.

The present invention relates to a program development technique based on XML (eXtensible Markup Language) and an information processing technique based on the XML.

BACKGROUND OF THE INVENTION

Conventionally, the development of a business program has been performed based on unified consideration given to screens and input/output data, function division of the program, the structure of the program, data items of a database, and the like. Thus, simultaneous and parallel design of one business program has been impossible, and when the scale of the business program becomes large, a development period has often become long. Besides, when the change and addition of the specifications are performed, an overall review becomes necessary, and an increase in examination time and an increase in correction time have occurred.

In order to solve the problems as stated above, U.S. Pat. No. 5,933,634 discloses a technique to reduce an amount of feedback after a program is manufactured, by displaying a screen in a similar manner as in actual program execution, and verifying the program, in a program design process prior to a program manufacturing process of a transaction routine, and to also make program generation efficient, by inheriting design data from the design process to the program manufacturing process.

However, in the technique disclosed in the aforementioned U.S. patent, the individual business routines must be created on the basis of the automatically inherited design data, and when the program is created simultaneously in parallel, omission in program creation may occur. Besides, because the transfer of input data at the execution of the program is performed through an ID decided at the time of design, when a correction is performed later, a person other than the designer cannot easily understand it.

SUMMARY OF THE INVENTION

An object of the present invention is therefore to provide a technique, which can shorten a development period and enables development of a business program with higher quality.

Another object of the invention is to provide a basic technique for executing the business program created by the program development technique of this invention.

An information processing method according to a first aspect of the invention comprises: analyzing XML data stored in an XML data storage and corresponding to a form screen, and specifying a business class corresponding to a tag included in the XML data; referring to a business class manager in which items of business classes to be created are registered, and judging whether an item of the specified business class has not been registered in the business class manager; and if the item of the specified business class has not been registered in the business class manager, registering the item of the specified business class in the business class manager.

When the business class is created on the basis of the tag of the XML data corresponding to the form screen, because the items of the business classes to be created are managed in the business class manager, the program development can be performed without creating duplicate business classes and without causing insufficiency. Incidentally, because the business class corresponding to the tag of the XML data has only to be prepared, the business class can be created even if the entire system is not grasped, the improvement of quality of the business program is easy, and the development period can also be reduced.

Besides, the information processing method may further comprises, if the item of the specified business class has not been registered in the business class manager, generating template source program data (for example, a file) for the specified business class, and storing it into a source program storage. A programmer has only to create a program to realize a predetermined function by using the created template source program data, and can prepare the business class without any excess and deficiency.

Further, a template source file for an object to store data concerning a form item may also be generated by a similar processing to the business class.

An information processing method according to a second aspect of the invention is an information processing method relating to an execution method of business classes created using, for example, the aforementioned method and comprises: storing XML data including a tag corresponding to data input or selected for a form screen into a memory, and specifying a business class that corresponds to the tag included in the XML data and is a program for carrying out a processing relating to the tag; and calling the specified business class among business classes which are defined in advance and are loaded in the memory.

Because a business class is originally created so as to correspond to a tag included in the XML data, when the XML data including the specific selected or input data is inputted, the specific selected or input data is processed by calling the business class corresponding to the tag included in the XML data.

Besides, a processing sequence for the whole of the form may not be defined so as to correspond to the form for the form screen, and each of business classes may be configured so that a processing for the form is completed by processing the called business classes. As stated above, when the necessary business logic is implemented as the class corresponding to the tag of the XML data, the efficiency of system development is improved.

Incidentally, if there is no business class corresponding to the tag, an error may be notified, because the XML data is unsuitable.

Besides, the information processing method according to the second aspect of the invention may further comprises receiving the data input or selected for the form screen from a device that displayed the form screen, and generating the XML data including the tag corresponding to the data input or selected for the form screen.

Moreover, the information processing method according to the second aspect of the invention may further comprise: outputting the data input or selected for the form screen to a form item storing object, which is defined in advance and is loaded in a memory; storing the data input or selected for the form screen into the memory by the form item storing object; and executing a processing by exchanging data between the called business class and the form item storing object.

Further, the information processing method according to the second aspect of the invention may further comprise: if an output request is received from the called business class, generating XML data for output by using data held in the form item storing object, and storing it into the memory; and outputting the XML data for output, stored in the memory to the device that displayed the form screen.

Besides, it is also possible to create a program for causing a computer to execute the aforementioned information processing method of the invention, and the program is stored in a storage medium or a storage apparatus such as, for example, a flexible disk, a CD-ROM, a magneto-optical disk, a semiconductor memory, or a hard disk. There is also a case where the program is transmitted as digital signals through a network. Besides, intermediate processing result is temporarily stored in a storage device such as a main memory of a computer.

BRIEF DESCRIPTION OF THE DRAWINGS

FIG. 1 is a functional block diagram at the time of creation of business classes;

FIG. 2 is a diagram showing an example of data stored in a business class management file;

FIGS. 5A to 5H are diagrams showing examples of codes to use the object;

FIG. 8 is a diagram showing an example of an input screen;

FIG. 9 is a diagram showing an example of XML data for the input screen;

FIG. 12 is a diagram showing an example of XML data for an output screen; and

FIG. 13 is a diagram showing an example of the output screen.

DETAILED DESCRIPTION OF THE PREFERRED EMBODIMENTS

Figure 3:
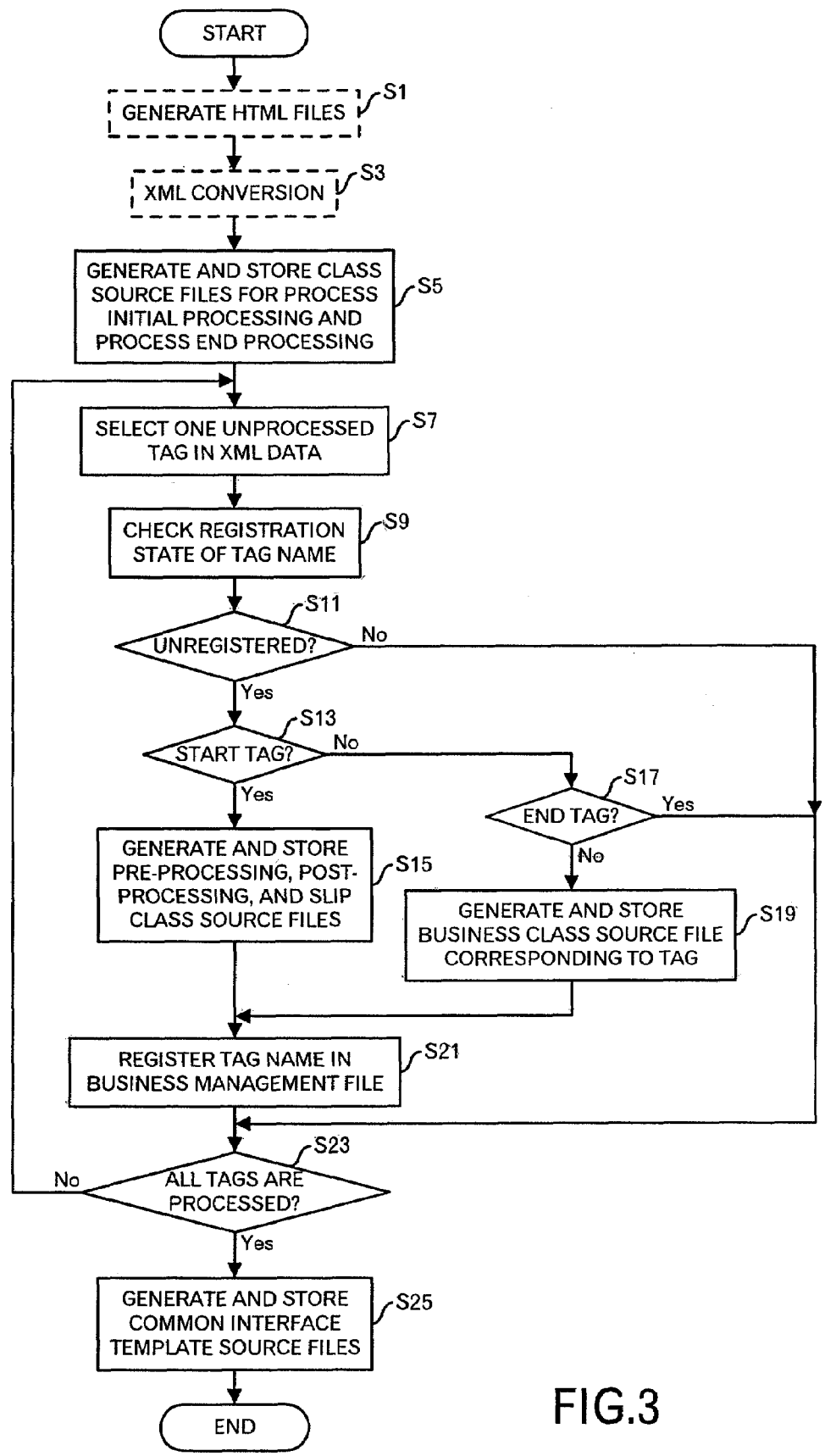
FIG. 3 is a diagram showing a processing flow at the time of creation of the business classes.

1. Creation of Business Classes (i.e. Programs)

FIG. 1 is a functional block diagram of a computer system in an embodiment of the invention at the time of creation of business classes. A computer system 100 includes a screen generator 1 for forming a screen to be displayed in a system under development, and generating an HTML (hyper Text Markup Language) file and the like for the screen; HTML file storage 3 for storing the HTML files generated by the screen generator 1; XML converter 5 for analyzing the HTML file stored in the HTML file storage 3 and converting it into XML data in accordance with a predetermined rule; XML data storage 7 for storing the XML data and the like generated by the XML converter 5; interface manager 9 for analyzing the XML data stored in the XML data storage 7, and generating at least a part of a common interface file group 11, and template business source file group 13; and business class management file 15 referred to and updated by the interface manager 9.

The screen generator 1 is a generally sold homepage editor or the like, and generates an HTML file and the like when a user forms a screen without describing tags of the HTML. For example, as shown in FIG. 1, it is assumed that a deposit transaction screen 1a including input columns of a bank name, branch name, account type, account number and transaction amount is configured, and a corresponding HTML file and the like are generated. The generated HTML file is stored in the HTML file storage 3.

The XML converter 5 is a generally sold XML document generation support tool such as XML SPY (trademark of ICON Information-Systems), and reads out the HTML file stored in the HTML file storage 3, generates XML data, a style sheet (XSL (extensible Style Language) data) and schema, and stores them in the XML data storage 7. Incidentally, in the following, in order to facilitate the grasp of the point of this embodiment, an explanation on the XML data will be mainly given, however, XSL data includes data (format, etc.) to display the XML data on the screen. Besides, the schema includes data (tag structure, etc.) to perform adequacy check of the XML data. As shown in FIG. 1, XML data 5a including tags (including a start tag and end tag.) for the deposit transaction input, a bank name tag, branch name tag, account type tag, account number tag, and transaction amount tag is generated from the HTML file for the screen 1a. In addition, the XSL data and the schema corresponding to the XML data 5a are generated.

The template business source file group 13 includes files of template source programs, which correspond to the tags included in the XML data and are generated by the interface manager 9. As shown in FIG. 1, when the interface manager 9 processes the XML data 5a, it generates a business class 131 of "deposit transaction input pre-processing" to perform a pre-processing for a slip of the deposit transaction input, business class 132 of "bank name" corresponding to the bank name tag, business class 133 of "branch name" corresponding to the branch name tag, business class 134 of "account type" corresponding to the account type tag, business class 135 of "account number" corresponding to the account number tag, business class 136 of "transaction amount" corresponding to the transaction amount tag, business class 137 of "deposit transaction input" corresponding to a slip processing of the deposit transaction input, and business class 138 of "deposit transaction input post-processing" to perform a post-processing for the slip of the deposit transaction input as template source files. The template source files merely include basic source codes as the business classes, and the business logic is required later to be programmed as, for example, a method. Incidentally, the template source file may be empty.

An example of the template source file of the business class for the account number will be set forth in the following. Incidentally, because the contents are written in the well-known Java (trademark of Sun Microsystems, Inc.) language, the detailed description will be omitted.

TABLE 1 package com.fff.xxxx.usr;
import com.fff.xxxx.common.*;
import com.fff.xxxx.util.*;
import com.fff.xxxx.processor.*;
//Class:USR_ACCOUNT_NUMBER
public class USR_ACCOUNT_NUMBER implements
XxxxUserProcessLibrary TABLE 1-continued

```
{
    //Constructor
    public USR__ACCOUNT__NUMBER( )
    {
        //Please describe processing contents for the constructor here.
    }
    //Process execution function
    public void process (XxxxInterface rinterface) throws Exception
    {
        //Obtain own region from the object pool
        String ACCOUNT__NUMBER = (String)rinterface.getValue__XML
("ACCOUNT__NUMBER");
        //Please describe codes for each processing unit here.
    }
}
```

Besides, the common interface file group 11 includes a slip item region 111, processor reserved region 112, interclass interface region 113, application constant region 115, database (DB) information region 117, and initial setting file 119 created by the user using an editor or the like. These regions except for the initial setting file 119 are regions to store template source programs (hereinafter referred to as a common interface template source file) of objects used in common by plural business classes. The common interface template source file merely includes basic source codes similarly to the template source files of the business classes described above, and the logic is required later to be programmed as, for example, a method. Besides, the common interface template source file may be empty.

The slip item region 111 stores common interface template source files of objects to store data of the slip items. The common interface template source file stored in the slip item region 111 is generated by the interface manager 9 on the basis of the XML data. For example, the common interface template source file is generated so as to correspond to each of slip items included in the XML data.

An example of the common interface template source file relating to the slip item of the account number will be set forth in the following. However, because the contents are described in the well-known Java language, the detailed description will be omitted.

TABLE 2

```
package com.fff.xxxx.pool;
import com.fff.xxxx.*;
import com.fff.xxxx.common.*;
import java.util.*;
////for LOG output
/*LOG*/import com.fff.OPERAPARTS.com.SSCLG00C;
/** Class:com__ACCOUNT__NUMBER */
public class com__ACCOUNT__NUMBER implements
XxxxCommonInLibrary{
    /** Flag to indicate a storing order in a hash */
    public int flagGet = 0;
    /** Flag to indicate a reading order in the hash */
    public int flagSet = 0;
    /** Flag to indicate a storing order in an error hash */
    public int errflagGet = 0;
    /** Flag to indicate a reading order in the error hash */
    public int errflagSet = 0;
        /** Hash table to store child tag class */
        private Hashtable childtags = new Hashtable( );
        /** Hash table to store values */
        private Hashtable values = new Hashtable( );
        /** Hash table to store error codes */
        private Hashtable errors = new Hashtable( );
        /** Hash table to manage an attribute hash */
        private Hashtable attributes = new Hashtable( );
        /** Hash table to store attribute values */
////for LOGoutput
```

TABLE 2-continued

```
/*LOG*/    private SSCLG00C ewkoSsclg00c;
    /** Constructor */
    public com__ACCOUNT__NUMBER( ){
        //Please describe processing contents in the constructor here
////for LOG output
/*LOG*/ ewkoSsclg00c =
new SSCLG00C(this.getClass( ).getName( ));
    }
    /** Process execution function */
    public void process(XxxxInterface rinterface){
        ewkoSsclg00c.mvLogWrite(3,"Process calling class name :
com__ACCOUNT__NUMBER.process( )");
    }
        /** set method */
        public void set(Object val){
            String numstr = String.valueOf(flagGet);
            values.put(numstr, val);
            flagGet += 1;
        }
        /** get method */
        public Object get(int key){
            String numstr = String.valueOf(key);
            return values.get(numstr);
        }
        /** Obtain the first item of get method */
        public Object get( ){
        String numstr = String.valueOf(flagGet – 1);
            return values.get(numstr);
        }
        /** Clear contents of value table */
        public void clearValue( ){
        attributes,clear( );
        values,clear( );
        clearStatus( );
        flagGet = 0;
        }
        // Store error codes
        public void setStatus(int value){
        String numstr = String.valueOf(errflagGet);
        errors.put(numstr, new Integer(value));
        errflagGet += 1;
        }
        //obtain error codes
        public int getStatus( String key){
            return ((Integer)errors.get(key)).intValue( );
        }
        //Obtain error codes
        public int getStatus( ){
            String numstr = String.valueOf(errflagGet – 1);
            return ((Integer)errors.get(numstr)).intValue( );
        }
        /** clear contents in an error code storage table */
        public void clearStatus( ){
        errors.clear( );
        errflagGet = 0;
        setStatus(0);
        }
        //obtain repeat number
        public int getNumber( ){
            return values.size( );
        }
        //obtain attribute values
        public Object getAttr(int num, String attsname){
            String numstr = String.valueOf(num);
            Hashtable attshash = (Hashtable)attributes.get(attsname);
            return attshash.get(numstr);
        }
        //Set an attribute value
        public void setAttr(int num, String attsname, Object attsVal){
            String numstr = String.valueOf(num);
            Hashtable attshash = (Hashtable)attributes.get(attsname);
            attshash.put(numstr, attsVal);
        }
        //return an attribute name
        public Enumeration getAttrNames( ){
            return attributes.keys( );
        }
        //Return a hash value storing the attribute value from the
attribute name
        public Hashtable getAttrs(String attsname){
```

TABLE 2-continued

```
            return (Hashtable)attributes.get(attsname);
        }
}
```

The processor reserved region 112 stores common interface template source files of objects to store data used for the control of a processor (processor 2071 in FIGS. 6A and 6B) relating to the execution processing of the business classes. The common interface template source files to be stored in the processor reserved region 112 are generated by the interface manager 9 in accordance with data items, which are set through a screen input function (i.e. user interface) included in the interface manager 9, and are stored in the processor reserved region 112. The screen input function is a function to cause a screen for receiving data input from a user to be displayed and to set items on the basis of the inputted data.

The interclass interface region 113 stores common interface template source files of objects to store data relating to interface items between business classes. Incidentally, the interface item between the business classes is, for example, an item used to perform the transfer of data between plural business classes. The common interface template source files to be stored in the interclass interface region 113 are generated by the interface manager 9 in accordance with data items, which are set through the screen input function included in the interface manager 9 similarly to the common interface template source file stored in the processor reserved region 112, and are stored in the interclass interface region 113.

The application constant region 115 stores common interface template source files of objects to store data of constant items referenced by the business classes. Incidentally, the constant item referenced by the business class is an item, which is set on the basis of data defined in the initial setting file 119, and is an item relating to a business rule such as a program executable time zone. The common interface template source files to be stored in the application constant region 115 are generated by the interface manager 9 in accordance with data items, which are set through the screen input function included in the interface manager 9, similarly to the common interface template source files stored in the processor reserved region 112 or the interclass interface region 113, and are stored in the application constant region 115.

The DB information region 117 stores common interface template source files of objects to store data of table definition items in a database. The common interface template source files to be stored in the DB information region 117 are generated by the interface manager 9 on the basis of the XML data similarly to the common interface template source files stored in the slip item region 111. For example, the common interface template source file is generated so as to correspond to each of the slip items included in the XML data.

The initial setting file 119 is a file including data of the aforementioned constant items, in the XML format, for example. In the execution processing of the business class, this file is read when the processing is executed by the business classes, and data of the constant items is held in the corresponding object.

The business class management file 15 includes, for example, data as shown in FIG. 2. FIG. 2 shows a screen example in a case where the XML data (i.e. business class management file 15) not specifying an XSL file is displayed by an XML-compliant browser. In FIG. 2, it is indicated by resource management tags, that the resource management required in a program to be developed is performed by the business class management file 15. Besides, in this embodiment, not only the business classes, but also the common interface file group 11 are managed, and object pool tags are provided. Here, the object pool is a memory area in which in a case where executable classes are created on the basis of the common interface template source files, the classes are loaded at the time of execution of the processing. A processor reserved region tag corresponding to the processor reserved region 112, slip item region tag corresponding to the slip item region 111, DB information region tag corresponding to the DB information region 117, application constant item region tag corresponding to the application constant region 115, and interclass interface item region tag corresponding to the interclass interface region 113 are provided under the object pool tag. In FIG. 2, a "+" mark indicates that items, which have already been defined, exist under the processor reserved region tag and interclass interface item region tag. On the other hand, an item, which has been defined, does not yet exist under the DB information region tag and application constant item region tag. Here, "that an item has been defined" means that common interface template source files corresponding to the items are generated and are stored in one of the regions of the common interface file group 11.

The common interface template source files corresponding to any of the regions are also stored in the respective regions by the interface manager 9. Then, when the interface manager 9 stores the common interface template source file in any one region, an item corresponding to the common interface template source file is registered under the tag corresponding to the region.

In FIG. 2, already defined items exist under the slip item region tag and are specifically shown. There are provided a "deposit transaction input" tag, "transaction amount" tag, "account number" tag, "account type" tag, "branch name" tag, and "bank name" tag corresponding to the screen 1a in FIG. 1. In the "deposit transaction input" tag, an attribute of "route judgment" is defined, because the "deposit transaction input" corresponds to the slip. Besides, an attribute of the "registered date and time" is defined in each tag.

Besides, in FIG. 2, the business classes to be created (that is, the generated template business source files) are defined under the template business class tag. Here, there are included a transaction amount tag, account number tag, account type tag, branch name tag, bank name tag, deposit transaction input pre-processing tag, deposit transaction input post-processing tag, and deposit transaction input tag. Incidentally, an attribute of the "registered date and time" is defined in each tag. Besides, USR in front of the tag name indicates that it is a class to be prepared by a user.

Next, a processing flow of the computer system 100 shown in FIG. 1 will be described with reference to FIG. 3. First, the user of the computer system 100 examines the present slip, form and screen configuration, grasps functions to be added or modified for a new computer system to be developed, and performs screen configuration for the new computer system by the screen generator 1. By this work, the screen generator 1 generates HTML files and the like and stores them in the HTML file storage 3 (step S1). Incidentally, because the HTML file can be created without using any tool or the like, this step is indicated by a dotted line block. Besides, the tool to perform the processing of this step can also be prepared by the user, separately from the interface manager 9.

Next, the XML converter 5 reads out the HTML file stored in the HTML file storage 3, generates XML data, and stores it into the XML data storage 7 (step S3). At this time, XSL data and schema corresponding to the XML data are also generated and are stored in the XML data storage 7. Incidentally, the tool to perform the processing of this step can also be prepared by the user, separately from the interface manager 9, and this step is indicated by a dotted line block. Next, the interface manager 9 generates template source programs for a process initial processing class and process end processing class, and stores them into, for example, a storage device to store the template business source file group 13 (step S5). The source programs for the process initial processing class and process end processing class are also templates, and programs to realize specific functions for the process initial processing and process end processing are later programmed.

Then, the interface manager 9 refers to the XML data storage 7, and selects one unprocessed tag in the XML data (step S7). Then, it refers to a portion under the template business class tag of the business class management file 15 and confirms whether the tag selected at the step S7 is not registered (steps S9 and S11). That the tag is already registered under the template business class tag of the business class management file 15 means that the template business source file is also already generated, and when it is again generated, duplication occurs. Therefore, this confirmation is carried out. In a case where it is judged that the tag is already registered, the processing proceeds to step S23. On the other hand, in a case where it is confirmed that the tag has not been registered, it judges whether the tag is the start tag (step S13). That is, it judges whether the tag is a tag to specify the slip in the XML data. In a case where the tag is judged to be the start tag, the template source programs for the pre-processing class of the slip, post-processing class thereof and slip class are generated, and are stored n, for exampler the storage device to store the template business source file group 13 (step S15). Then, the processing proceeds to step S21. On the other hand, in a case where the tag is judged not to be the start tag, it judges whether the tag is the end tag (step S17). For example, it judges whether the tag is an end tag of the tag to specify the slip. In a case where the tag is judged to be the end tag, the processing proceeds to step S23. On the other hand, in a case where the tag is judged not to be the end tag, because it is a normal tag, the template source program of the business class corresponding to the tag is generated, and is stored in, for example, the storage device to store the template business source file group 13 (step S19). Although described above, the template source program merely includes basic source codes, and the business class is not completed only by that template source program.

After the step S15 or the step S19, the tag name is registered under the template business class tag of the business class management file 15 (step S21). By this registration, a duplicate business class is not created, which enhances the business efficiency in the program development and improves the quality of the program. Then, it judges whether all tags are processed (step S23). In a case where there is an unprocessed tag, the processing returns to the step S7.

Incidentally, in the above processing, although the template source programs for the pre-processing class of the slip, post-processing class thereof, and slip processing are generated so as to correspond to the start tag, the above template source programs may be generated so as to correspond to the end tag.

Then, the interface manager 9 generates the common interface template source programs corresponding to the respective regions in the common interface file group 11, and stores them in the respective regions of the common interface file group 11 (step S25). Because the common interface template source files stored in the slip item region 111 and the DB information region 117 correspond to the respective slip items, they are generated in the same processing flow as the aforementioned processing to generate the template source programs of the business classes. That is, one unprocessed tag corresponding to the slip item is selected from among the tags included in the XML data, and it is judged whether the tag has not been registered by referring to portions under the slip item region tag and DB information region tag, which are set under the object pool tag in the business class management file 15. When the tag has not been registered, the common interface file template source file corresponding to the tag is generated for each of the slip item region 111 and DB information region 117, and a tag is registered under the object pool tag in the business class management file 15. However, the processing may be such that after it is confirmed that the tag has not been registered in the business class management file 15, it is confirmed whether the tag is a tag corresponding to the slip item.

Besides, the common interface template source files stored in the processor reserved region 112, interclass interface region 113 and application constant region 115 are generated on the basis of the input data from the user, which is received through the screen input function included in the interface manager 9. When generating the common interface template source files, the interface manager 9 registers corresponding tags under the tags corresponding to the respective regions in the business class management file 15.

Incidentally, in the above explanation, although the processing flow of generating the template source program (basically, files for those programs) has been described, it is not always necessary to generate the template source programs and the common interface template source files. There is also a case where it is sufficient if the business classes and/or common interface files to be created are registered in the business class management file 15. In such a case, the source programs may be programmed so as to correspond to the items in the business class management file 15. Then, at the point of time when the programming is completed, matching the created programs with each item of the business class management file 15 has only to be performed again.

As for the template source programs and common interface template source file generated by the aforementioned processing, the programming is carried out so as to adapt them for the business logic. That is, as for the template source program, only items common to the template source programs have been inputted, and functions to be realized in each class are separately programmed by programmers. Besides, also with respect to the common interface template source files, similarly, only items common to the common interface template source files have been inputted, and functions to be realized in each file are separately programmed by the programmers. The programmed source program is compiled to generate an executable program module.

At this time, the programming is carried out so that the XML data corresponding to a specific slip can be processed by only business classes determined to be generated at the step S15 and step S19 and objects in the object pool, which are required by the business classes. Although described below, this is because when the XML data corresponding to the specific slip is processed, only the business classes determined to be generated at the step S15 and step S19 are called on the basis of the tags included in the XML data. Incidentally, although the objects in the object pool are called by the business classes, they support the processing by the business classes, and the main entities of the processing are the business classes. Differently from the background art, it is not necessary to prepare the main control logic to sequentially process the XML data in previously defined order, and respective objects defined by the tags in the XML data are executed by the business classes.

Figure 4:
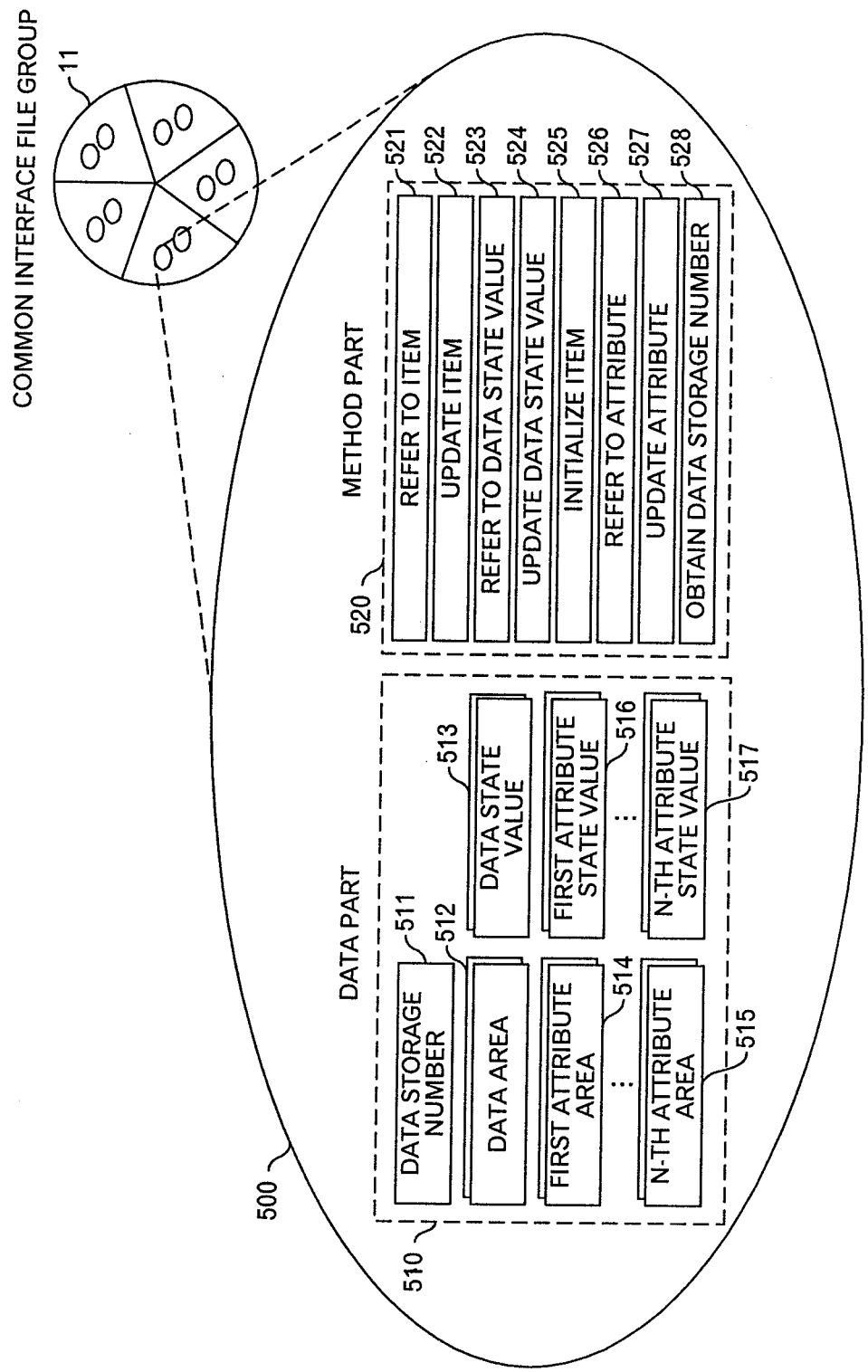
FIG. 4 is a schematic diagram showing an object.

Incidentally, with respect to the common interface template source files stored in each region of the common interface file group 11, the programming is carried out to realize an object as shown in FIG. 4. Incidentally, the configuration of the object shown in FIG. 4 is the same in the object pool, and for example, a specific template object 500 includes a data part 510 and method part 520. The data part 510 includes an area 511 for the data storage number, one or plural data areas 512, one or plural data state value areas 513, one or plural first attribute data areas 514, . . . , one or plural n-th (n is, for example, a natural number) attribute data areas 515, one or plural first attribute state value areas 516, . . . , and one or plural n-th attribute state value areas 517. Besides, the method part 520 includes an item reference part 521, item update part 522, data state value reference part 523, data state value update part 524, item initialization part 525, attribute reference part 526, attribute update part 527, and data storage number obtaining part 528.

In order to use each object in the object pool as stated above, for example, codes as shown in FIGS. 5A to 5H are added to the template source programs of the business classes. FIG. 5A shows examples of codes to call the item reference part 521 shown in FIG. 4 for the respective regions of the common interface file group 11. First, at the first line, the code of "object pool instance variable.getValue (slip item name, array number)" is indicated as the example of the code to call the item reference part 521 of the object corresponding to the slip item region 111. For example, the programmer can define the processing with the suitable object by setting values to specify item data, in the "object pool instance variable" portion, "slip item name" portion and "array number" portion. Incidentally, in this embodiment, in a case where the array number is 0, this indicates a start record, and the same applies to the following description. The item reference part 521 of the object corresponding to the slip item region 111 obeys the code as stated above, and refers to the item data to return a value.

At the second line and the following, with respect to each of the DB information region 117, interclass interface region 113, application constant region 115, and processor reserved region 112, the example of the code to call the item reference part 521 of the object corresponding to that region is indicated in sequence. For example, the programmer can define the processing to refer to the item data held in the object pool by adding such codes to the template source program of the business class.

FIG. 5B shows examples of codes to call the item update part 522 shown in FIG. 4 for the respective regions of the common interface file group 11. First, at the first line, the code of "object pool instance variable.setValue (slip item name, data)" is indicated as the example of the code to call the item update part 522 of the object corresponding to the slip item region 111. For example, the programmer can define the processing with the suitable object by setting values to specify the item data in the "object pool instance variable" portion and "slip item name" portion and by setting data (or its variable) to be stored, in the "data" portion. The item update part 522 of the object corresponding to the slip item region 111 obeys the code as stated above and updates the item data. At the second line and the following, with respect to each of the DB information region 117, interclass interface region 113, application constant region 115, and processor reserved region 112, the example of the code to call the item update part 522 of the object corresponding to that region is indicated in sequence. For example, the programmer can define the processing of updating the item data stored in the object pool by adding such codes to the template source program of the business class.

FIG. 5C shows examples of codes to call the data state value reference part 523 shown in FIG. 4 for the respective regions of the common interface file group 11. First, at the first line, the code of "object pool instance variable. getError (slip item name, array number)" is indicated as the example of the code to call the data state value reference part 523 of the object corresponding to the slip item region 111. For example, the programmer can define the processing with the suitable object by setting the values to specify the item data in the "object pool instance variable" portion, "slip item name" portion and "array number" portion. The data state value reference part 523 of the object corresponding to the slip item region 111 obeys the code as stated above, and refers to the state value of the item data to return the value. At the second line and the following, with respect to each of the DB information region 117, the interclass interface region 113, application constant region 115, and processor reserved region 112, the example of the code to call the data state value reference part 523 of the object corresponding to that region is indicated in sequence. For example, the programmer can define the processing to refer to the state value of the item data stored in the object pool by adding such codes to the template source program of the business class.

FIG. 5D shows examples of codes to call the data state value update part 524 shown in FIG. 4 for the respective regions of the common interface file group 11. First, at the first line, the code of "object pool instance variable. setError (slip item name, data)" is indicated as the example of the code to call the data state value update part 524 of the object corresponding to the slip item region 111. For example, the programmer can define the processing with the suitable object by setting values to specify the item data in the "object pool instance variable" portion and "slip item name" portion, and by setting the state value (or its variable) to be stored in the "data" portion. The data state value update part 524 of the object corresponding to the slip item region 111 obeys the code as stated above, and updates the state value of the item data. At the second line and the following, with respect to each of the DB information region 117, the interclass interface region 113, application constant region 115 and processor reserved region 112, the example of the code to call the data state value update part 524 of the object corresponding to that region is indicated in sequence. For example, the programmer can define the processing to update the state value of the item data stored in the object pool by adding such codes to the template source program of the business class.

FIG. 5E shows examples of codes to call the data storage number obtaining part 528 shown in FIG. 4 for the respective regions of the common interface file group 11. First, at the first line, the code of "object pool instance variable. getSize (slip item name)" is indicated as the example of the code to call the data storage number obtaining part 528 of the object corresponding to the slip item region 111. For example, the programmer can define the processing with the suitable object by setting values to specify the item in the "object pool instance variable" portion and "slip item name" portion. The data storage number obtaining part 528 of the object corresponding to the slip item region 111 obeys the code as stated above, and acquires the data storage number to return the value. At the second line and the following, with respect to each of the DB information region 117, interclass interface region 113, application constant region 115, and processor reserved region 112, the example of the code to call the data storage number obtaining part 528 of the object corresponding to the region is indicated in sequence. For example, the programmer can define the processing to refer to the item data storage number stored in the object pool by adding such codes to the template source program of the business class.

FIG. 5F shows examples of codes to call the item initialization part 525 shown in FIG. 4 for the respective regions of the common interface file group 11. First, at the first line, the code of "object pool instance variable. clearValue (slip item name)" is indicated as the example of the code to call the item initialization part 525 of the object corresponding to the slip item region 111. For example, the programmer can define the processing with the suitable object by setting values to specify items in the "object pool instance variable" portion and "slip item name" portion. The item initialization part 525 of the object corresponding to the slip item region 111 obeys the code as stated above, and initializes the item data. At the second line and the following, with respect to each of the DB information region 117, interclass interface region 113, application constant region 115 and processor reserved region 112, the example of the code to call the item initialization part 525 of the object corresponding to that region is indicated in sequence. For example, the programmer can define the processing of initializing the item data stored in the object pool by adding such codes to the template source program of the business class.

FIG. 5G shows a code of "object pool instance variable. getAttributeVal (slip item name, array number, attribute name)" as an example of a code to call the attribute reference part 526 (FIG. 4) of the object corresponding to the slip item region 111. For example, the programmer can define the processing with the suitable object by setting values to specify the attribute data in the "object pool instance variable" portion, "slip item name" portion, "array number" portion and "attribute name" portion. The attribute reference part 526 of the object corresponding to the slip item region 111 obeys the code as stated above, and refers to the attribute data to return the value. For example, the programmer can program the processing of referring to the attribute value of the item data stored in the object pool by adding the code as stated above to the template source program of the business class.

FIG. 5H shows a code of "object pool instance variable. setAttributeVal (slip item name, array number, attribute name, attribute value)" as an example of a code to call the attribute update part 527 (FIG. 4) of the object corresponding to the slip item region 111. For example, the programmer can define the processing with the suitable object by setting values to specify the attribute data in the "object pool instance variable" portion, "slip item name" portion, "array number" portion and "attribute name" portion, and by setting an attribute value (or its variable) to be stored in the "attribute value" portion. The attribute update part 527 of the object corresponding to the slip item region 111 obeys the code as stated above and updates the attribute data. For example, the programmer can define the processing of updating the attribute value of the item data stored in the object pool by adding the code as stated above to the template source program of the business class.

2. Processing at the Time of Execution of the Business Classes

Figure 6A:
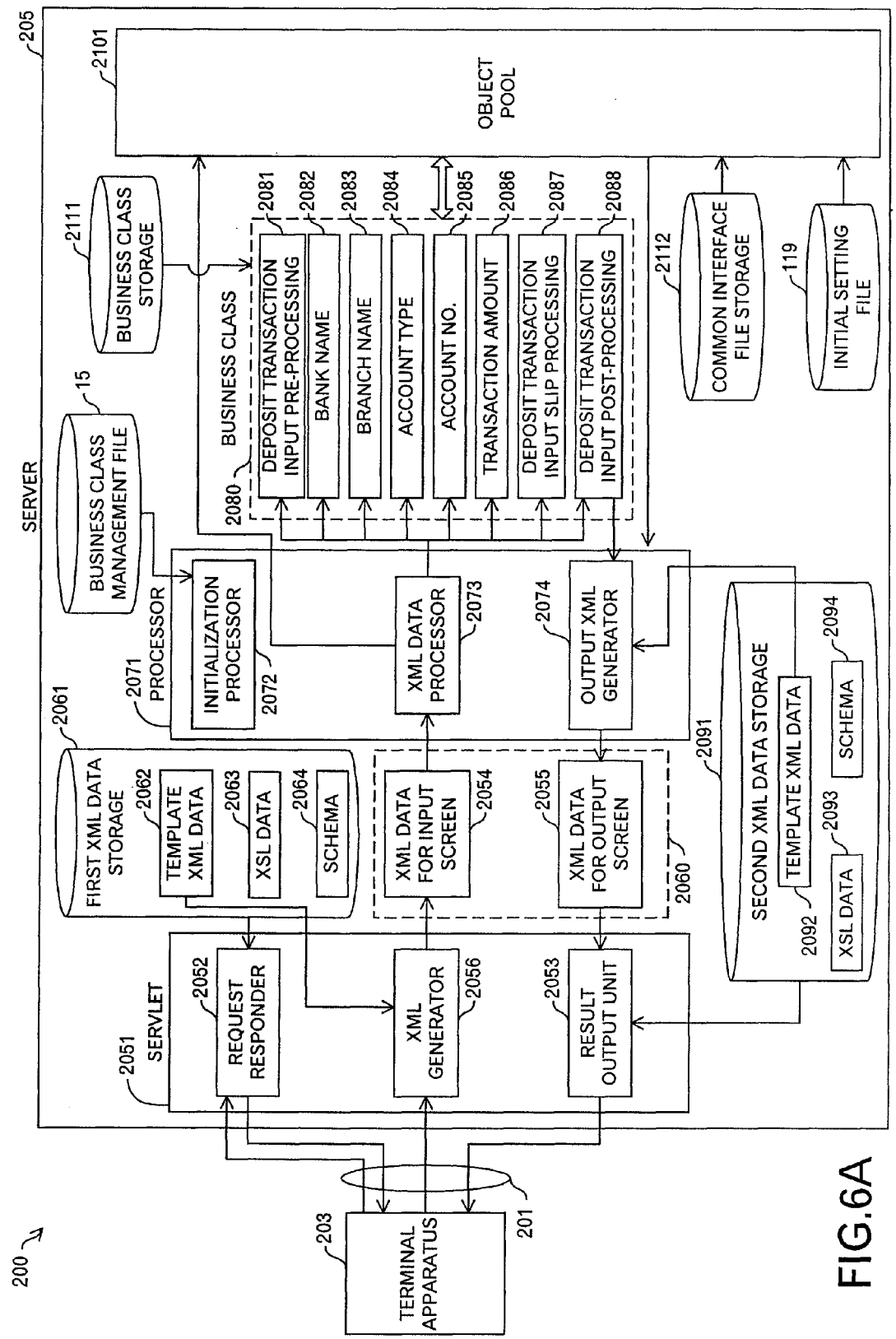
FIGS. 6A and 6B are functional block diagrams at the time of execution of the business classes.
Figure 6B:
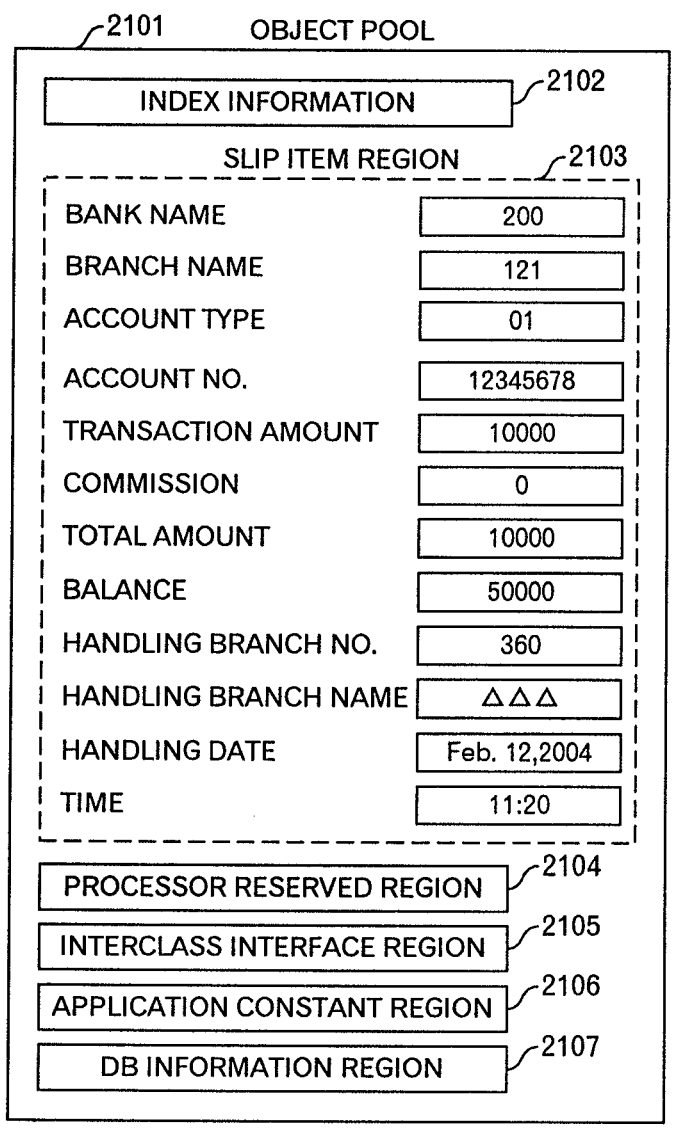

FIGS. 6A and 6B show a functional block diagram of a computer system according to an embodiment of the invention at the time when the business classes are executed. A computer network 201 is connected with one or plural terminal apparatuses 203, and a server 205 to carry out a main processing in this embodiment. The terminal apparatus 203 includes an XML-compliant browser. Besides, the server 205 includes a servlet 2051 as an interface with the browser in the terminal apparatus 203; memory area 2060 to store XML data 2054 for an input screen and XML data 2055 for an output screen; first XML data storage 2061 to store template XML data 2062, XSL data 2063 and schema 2064 for the input screen; processor 2071 for carrying out processings of analyzing XML data and of calling corresponding business classes; business class management file 15; memory area 2080 to which a business class group is loaded; second XML data storage 2091 to store template XML data 2092 for the output screen, XSL data 2093 and schema 2094; memory area 2101 (i.e. object pool) to which common interface files are loaded and which holds index information 2102; business class storage 2111 in which executable files of business classes are stored; common interface file storage 2112 to store executable common interface files, which are class files to form objects in the object pool; and initial setting file 119.

The servlet 2051 includes a request responder 2052 to carry out a processing to respond to a request from the browser in the terminal apparatus 203; XML generator 2056 to generate and output XML data (the XML data 3054 for the input screen) corresponding to selected or input data received from the browser of the terminal apparatus 203; and result output unit 2053 to receive the XML data (the XML data 2055 for the output screen) including a processing result from the processor 2071 and to output it to the browser of the terminal apparatus 203.

The processor 2071 includes an initialization processor 2072 to carry out an initialization processing to initialize the memory area 2101 (i.e. the common interface files are loaded from the common interface file storage 2112, and the index information 2102 is generated), and to load business classes from the business class storage 2111 to the memory area 2080; XML data processor 2073 to process the XML data 2054 for the input screen; and output XML generator 2074 to generate the XML data 2055 for the output screen on the basis of data stored in a slip item region 2103 of the memory area 2101 and the template XML data 2092 stored in the second XML data storage 2091. Incidentally, a DB information region 2107 of the memory area 2101 stores data in a hash table format, and data concerning a storing position of the data is stored in the index information 2102.

Next, the processing flow of the computer system 200 shown in FIGS. 6A and 6B will be described with reference to FIGS. 7 to 13. First, the request responder 2052 of the servlet 2051 in the server 205 receives a request for specific input screen data from the browser of the terminal apparatus 203 (step S31). Then, the request responder 2052 reads out the template XML data 2062 for the specific input screen and the XSL data 2063 corresponding to the template XML data 2062 from the first XML data storage 2061 and sends them to the browser of the terminal apparatus 203 (step S33). Incidentally, in the actual processing, the request responder 2052 first sends the template XML data 2062 to the browser of the terminal apparatus 203, and sends the XSL data 2063 to the browser of the terminal apparatus 203 in response to receiving the request to send the XSL data corresponding to the template XML data 2062 from the browser of the terminal apparatus 203. However, because this is not the gist of this embodiment, in the above description and the following description for a similar processing, a description is simplified so that the XML data and the XSL data are sent together.

When receiving the template XML data 2062 for the specific input screen and the XSL data 2063 corresponding to the template XML data 2062 from the server 205, the browser of the terminal apparatus 203 generates HTML file data and the like on the basis of the received data, and displays them on a display device. For example, a screen as shown in FIG. 8 is displayed on the display device of the terminal apparatus 203.

The example of FIG. 8 shows an input screen of the deposit transaction, and includes an input or selection column 601 of a bank name, input or selection column 602 of a branch name, selection column (here, radio button) 603 of an account type, input column 604 of an account number, input column 605 of a transaction amount, confirmation button 606, and return button 607. That is, tags corresponding to the slip name and the slip items are included in the template XML data 2062.

The user of the terminal apparatus 203 operates the terminal apparatus 203 to select or input data, and clicks the confirmation button 606. Then, the browser of the terminal apparatus 203 sends the input and/or selected data to the server 205 by, for example, a POST method of HTTP (Hyper Text Transfer Protocol). The XML generator 2056 of the servlet 2051 in the server 205 receives the input and/or selected data from the browser of the terminal apparatus 203, and temporarily stores it in the memory (step S35). Then, the XML generator 2056 analyses the input and/or selected data, generates the XML data 2054 for the input screen, and stores it in the memory area 2060 (step S37). Incidentally, the XML generator 2056 refers to, for example, the XSL data 2063, segments the input and/or selected data, and embeds them into the template XML data 2062 to generate the XML data 2054 for the input screen. Besides, the schema 2064 is used to confirm the adequacy of the XML data 2054 for the input screen. Then, the XML generator 2056 calls the processor 2071, and outputs the XML data 2054 for the input screen to the processor 2071 (step S39).

FIG. 9 shows an example of the XML data 2054 for the input screen. The example of FIG. 9 includes a deposit transaction input tag corresponding to the slip name, bank name tags put at both sides of actual data of 200, branch name tags put at both sides of actual data of 121, account type tags put at both sides of actual data of 01, account number tags put at both sides of actual data of 12345678, and transaction amount tags put at both sides of actual data of 10000.

On the other hand, the initialization processor 2072 of the processor 2071 in the server 205 carries out initialization of the object pool when, for example, a session with the terminal apparatus 203 is established (step S41). For example, reference is made to the business class management file 15, and the common interface files relating to classes listed as the object pool are loaded from the common interface file storage 2112 to the memory area 2101. Incidentally, the executable common interface files generated on the basis of the common interface template source files stored in each region of the common interface file group 11 are stored in the common interface file storage 2112.

Besides, the initialization processor 2072 refers to the business class management file 15, and loads all business class files stored in the business class storage 2111 to the memory area 2080 (step S43). Then, the initialization processor 2072 calls, for example, the process initial processing class and causes it to be executed (step S45). The process initial processing class is the class suitably programmed on the basis of the template source program generated at the step S5 of FIG. 3. Besides, the slip item region 2103 (i.e. object belongs to the slip item region 2103) and the like are initialized (step S47). At this time, item data based on the initial setting file 119 is stored in an application constant region 2106 by the process initial processing class.

Then, in response to the output of the XML data 2054 for the input screen by the servlet 2051 at the step S39, the XML data processor 2073 of the processor 2071 receives the XML data 2054 for the input screen (step S49). The XML data processor 2073 of the processor 2071 analyses and segments the XML data 2054 for the input screen, and stores actual data (input and/or selected data) into the corresponding area (object) of the slip item region 2103 (step S51). In a case where the XML data 2054 for the input screen as shown in FIG. 9 is processed, the actual data is stored in a data storage area (object) of the bank name, data storage area (object) of the branch name, data storage area (object) of the account type, data storage area (object) of the account number, and data storage area (object) of the transaction amount.

The XML data processor 2073 of the processor 2071 calls a pre-processing class (here, a deposit transaction input pre-processing class 2081) corresponding to the slip name of the XML data 2054 for the input screen, and causes it to execute a business processing (step S53). Besides, for each tag except for the end tag (step S55: No route), the XML data processor 2073 calls each business class (a bank name class 2082, branch name class 2083, account type class 2084, account number class 2085 and transaction amount class 2086) and causes them to execute the business processing (step S57). Then, when the end tag of the input screen XML data 2054 is detected (step S55: Yes route), the slip processing class (a deposit transaction input slip processing class 2087) corresponding to the slip name is called to execute a business processing (step S59). Then, a post-processing class (deposit transaction input post-processing class 2088) corresponding to the slip name is called and executed (step S61).

These called business classes reference or update the data stored in the objects belonging to each of the regions of the memory area 2101 (object pool) and suitably use them to execute the processing. Incidentally, during the processing in the business classes, data such as commission, total amount, balance, handling branch number, handling branch name, handling date, and time are separately generated and are stored in, for example, the objects belonging to the slip item region 2103 and the objects belonging to the DB information region 2107.

Figure 10A:
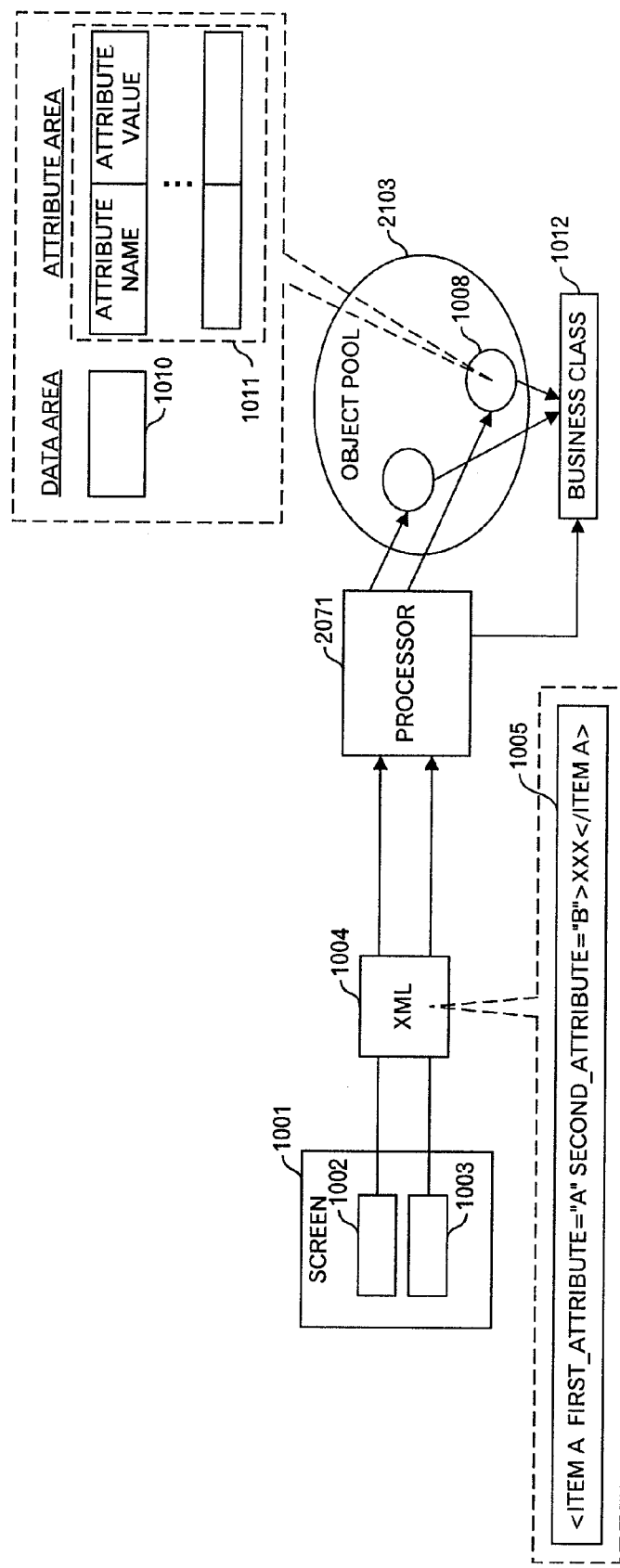
FIG. 10A is a diagram showing a first example of a processing using an object pool.

FIGS. 10A to 10D are conceptual diagrams to explain the processing using the object pool. Incidentally, in FIGS. 10A to 10D, only elements necessary for explaining the outline of the processing are shown, and there is a case where any element required for the actual processing is omitted. FIG. 10A shows an example of the processing using the objects, which belong to the slip item region 2103. In FIG. 10A, for example, a browser screen 1001 displayed on the display device of the terminal apparatus 203 includes an input item 1002 and input item 1003. Then, the user operates the terminal apparatus 203 and inputs data to at least one of the input item 1002 and input item 1003, and clicks a confirmation button or the like (not shown). Then, the input data corresponding to the input items 1002 and 1003 is sent to the server 205, and XML data 1004 (corresponding to the XML data 2054 for the input screen in FIGS. 6A and 6B) is generated by the servlet 2051. The XML data 1004 includes, for example, contents as indicated by an XML sentence 1005. That is, it includes a value of a first attribute of the input item and a value of a second attribute of the input item, and actual data inputted from the user. The processor 2071 specifies the objects corresponding to the input items from the object pool (here, the slip item region 2103) on the basis of the tag names of the XML data 1004, and outputs the value of the first attribute, value of the second attribute and actual data inputted from the user to the objects. Then, for example, an object 1008 stores the actual data into a data area 1010, and stores the value of the first attribute and value of the second attribute into attribute areas 1011. Like the example shown in FIG. 10A, in a case where plural attributes are defined, the values of the plural attributes are stored in the attribute areas 1011. Incidentally, the processor 2071 calls a business class 1012 on the basis of the tag of the XML data 1004. The business class 1012 calls an object (for example, the object 1008) in the object pool 2103 as the need arises, performs a reference processing or update processing of data stored in the data area 1010 and attribute areas 1011, and carries out the slip processing.

Figure 10B:
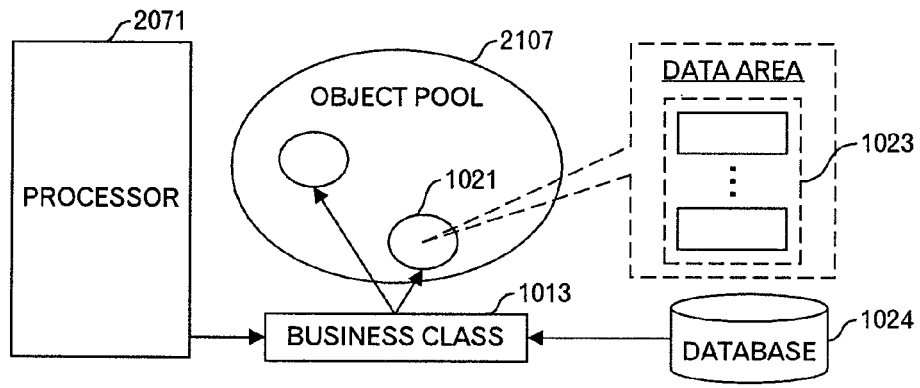
FIG. 10B is a diagram showing a second example of the processing using the object pool.

FIG. 10B shows an example of a processing using objects, which belong to the DB information region 2107. For example, a business class 1013 called from the processor 2071 outputs data of a record extracted from a DB 1024 to an object 1021 in the object pool (here, the DB information region 2107). Then, the object 1021 stores the data into a data area 1023. In a case where the business class 1013 extracts plural records from the DB 1024, the data of the plural records are respectively stored in the data area 1023. Incidentally, the data area 1023 is, for example, a hash table.

Figure 10C:
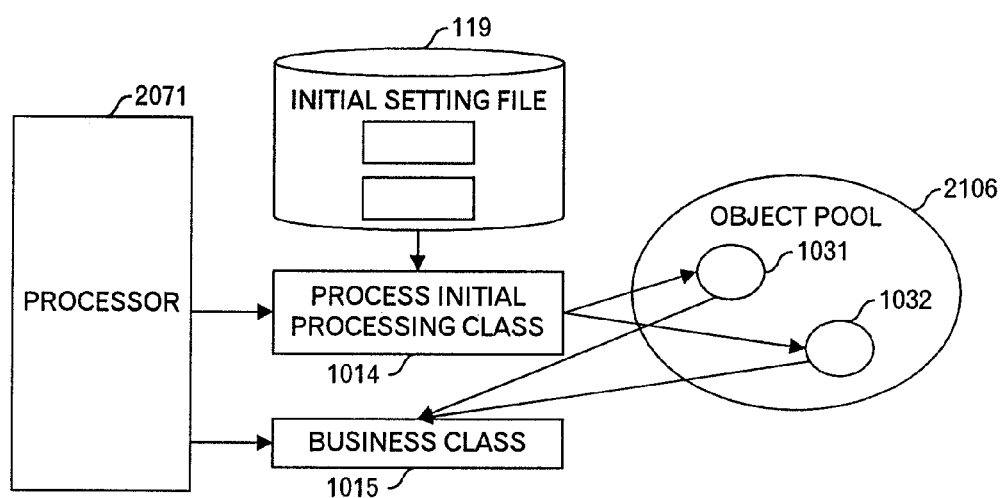
FIG. 10C is a diagram showing a third example of the processing using the object pool.

FIG. 10C shows an example of a processing using objects, which belong to the application constant region 2106. Although described above, when executing the initialization of the object pool, the processor 2071 (initialization processor 2072) calls a process initial processing class 1014. The process initial processing class 1014 reads out the initial setting file 119, and stores data of the application constant items into the objects in the application constant region 2106. For example, the data is stored in an object 1031 and object 1032. Then, for example, a business class 1015 calls the object 1031 or object 1032 as the need arises, and refers to the stored data to execute a slip processing.

Figure 10D:
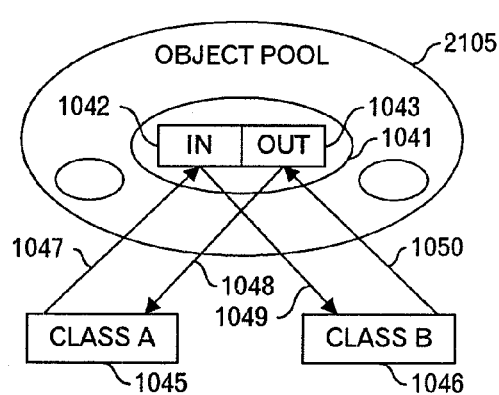
FIG. 10D is a diagram showing a fourth example of the processing using the object pool.
Figure 11:
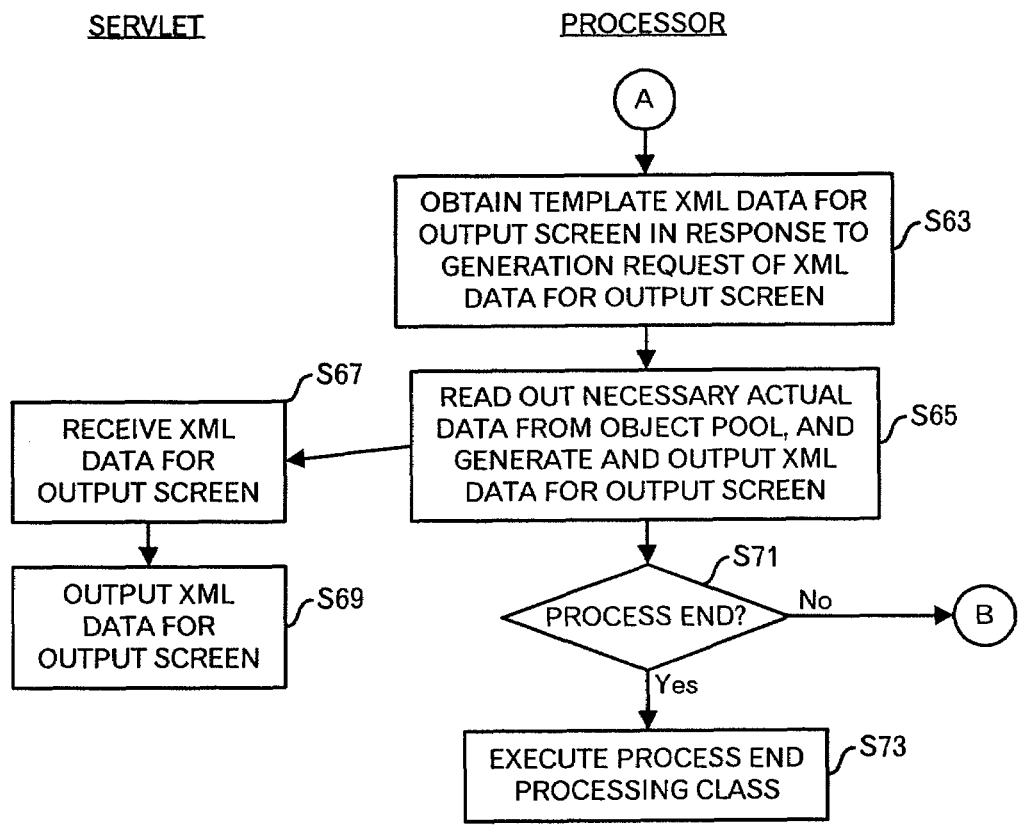
FIG. 11 is a diagram showing a second processing flow at the time of execution of the business classes.

FIG. 10D shows an example of a processing using objects, which belong to the interclass interface region 2105. FIG. 10D shows an example of a case where a processing is performed in which data is transferred from a class A (1045) as a business class to a class B (1046) as a business class, and data is returned from the class B (1046) to the class A (1045). First, the class A (1045) outputs the data to an object 1041 for the class B, which belongs to the object pool (here, the interclass interface region 2105) as indicated by an arrow 1047. Then, the object 1041 stores the data into an input area 1042. Next, the class B (1046) refers to the data stored in the input area 1042 as indicated by an arrow 1049. Then, the class B (1046) outputs the data generated by performing a predetermined processing on the basis of the referenced data, to the object 1041 as indicated by an arrow 1050. The object 1041 stores the data received from the class B (1046) into an output area 1043. Then, the class A (1045) refers to the data stored in the output area 1043 as indicated by an arrow 1048. As stated above, the data is not directly exchanged between the business classes, but is exchanged through the object belonging to the interclass interface region 2105. By this configuration, because each business class can be programmed without considering another business class, the programming efficiency is improved.

Incidentally, with respect to the specific processing contents of each business class, programming is performed according to the business logic, and although described above, the processing for a specific slip is configured so as to be appropriately completed by the processing with the business classes called by the XML data processor 2073 on the basis of the XML data 2054 for the input screen. Besides, if a tag corresponding to a business class, which does not actually exist, is included among the tags included in the XML data 2054 for the input screen, the XML data processor 2073 fails in the calling of the business class. In such a case, because a suitable processing cannot be carried out, or an unsuitable input occurs, an error is outputted to the servlet 2051, and the processing is terminated.

When all processings are completed, the post-processing class (the deposit transaction input post-processing class 2088) outputs a generation request of second XML data (that is, an output slip generation request including the document name of the XML data for the output screen) to the output XML generator 2074 of the processor 2071. The processing shifts to a processing of FIG. 11 through a terminal A of FIG. 7.

The output XML generator 2074 obtains the template XML data 2092 from the second XML data storage 2091 in response to the generation request of the XML data for the output screen (step S63). At this time, the schema 2094 corresponding to the XML data for the output screen is also obtained. Besides, the actual data of the data items corresponding to the tags included in the read template XML data 2092 is received from the objects belonging to the slip item region 2103 of the memory area 2101, and is embedded in the template XML data 2092, so that the XML data 2055 for the output screen is generated and is stored in the memory area 2060. At this time, the adequacy of the XML data 2055 for the output screen is confirmed by using the schema 2094. Then, the XML data 2055 for the output screen is outputted to the servlet 2051 (step S65).

FIG. 12 shows an example of the XML data 2055 for the output screen. The example of FIG. 12 includes a tag specifying a style sheet (output_screen.xsl), tag expressing a slip name (deposit transaction result tag), tags expressing slip items (transaction date tag, time tag, bank name tag, branch name tag, account type tag, account number tag, transaction amount tag, commission tag, total amount tag, balance tag, handling branch number tag, handling branch name tag), and actual data corresponding to the respective tags.

Figure 7:
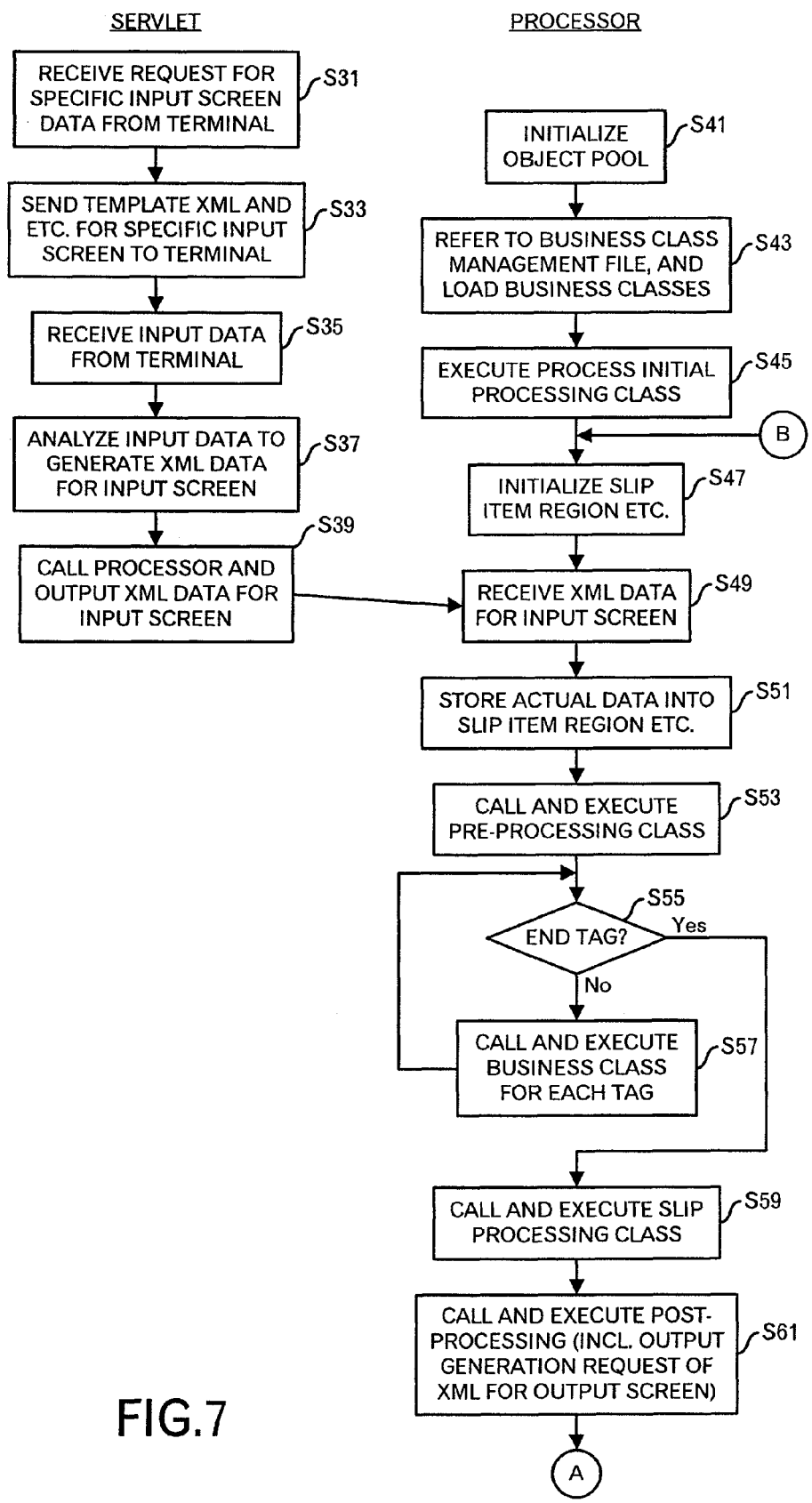
FIG. 7 is a diagram showing a first processing flow at the time of execution of the business classes.

Incidentally, when it is judged that the process is not ended at the processor 2071 side, the processing returns to the step S47 of FIG. 7 through a terminal B. On the other hand, when it is judged that the process is ended, a process end processing class is called and is executed (step S73). The process end processing class is a suitably programmed class on the basis of the template source program generated at the step S5 of FIG. 3.

The result output unit 2053 of the servlet 2051 receives the XML data 2055 for the output screen from the processor 2071 (step S67), and outputs the XML data 2055 for the output screen and the XSL data 2093 read from the second XML data storage 2091 to the terminal apparatus 203 (step S69). The browser of the terminal apparatus 203 receives the XML data 2055 for the output screen and the XSL data 2093 from the server 205, generates HTML file data and the like, and displays them on the display device. For example, a screen as shown in FIG. 13 is displayed. In the example of FIG. 13, there are provided respective display columns of the output slip name (deposit transaction result), transaction date, time, bank name, branch name, account type, account number, transaction amount, commission, total amount, balance, handling branch number, and handling branch name. Further, a confirmation button 1301 and initial screen button 1302 to return to the menu are also provided.

As stated above, the business classes are suitably called, and the processing is carried out, so that the processing of forms including the slip is suitably performed. Incidentally, the servlet 2051 and processor 2071 can be used by all systems in common, and with respect to a portion varying according to each business (or slip), the necessary business classes are created. By adopting the program development method as stated above, it is possible to realize the reuse of the program, the division of work of the development, and the shortening of the development period. Further, because the business class is created while the functions are limited and it is separated from another business class, the improvement in quality of the program is obtained.

As described above, the embodiment of the present invention has been described, however, the invention is not limited to this. For example, the functional block diagrams shown in FIGS. 1 and 6A and 6B show functions merely separated for explanation of the embodiment, and they do not necessarily correspond to modules of the program.

Although the present invention has been described with respect to a specific preferred embodiment thereof, various change and modifications may be suggested to one skilled in the art, and it is intended that the present invention encompass such changes and modifications as fall within the scope of the appended claims.

What is claimed is:

1. An information processing method, comprising:
   obtaining XML data including data blocks inputted or selected for a form screen and tags each of which corresponds to one of said data blocks inputted or selected for said form screen;
   specifying executable programs each of which corresponds to one of said tags included in said XML data and carries out a processing for a corresponding data block included in said data blocks;
   specifying a pre-processing program, a post-processing program, and a form processing program that correspond to a form of said form screen and carrying out a processing relating to said form of said form screen; and
   calling the specified programs among a plurality of programs that are prepared in advance and are loaded on a memory.

2. The information processing method as set forth in claim 1, further comprising:
   outputting said data blocks inputted or selected for said form screen to a form item storing object that is defined in advance and is loaded on a memory;
   storing said data blocks inputted or selected for said form screen on said memory by said form item storing object; and
   performing a processing by exchanging data blocks between the called class and said form item storing object.

3. The information processing method as set forth in claim 2, wherein said performing comprises:
   if data blocks are transferred from a first executable program to a second executable program, outputting said data blocks to an interprogram interface object that is defined in advance and is loaded on said memory, by said first executable program; and
   referring to said interprogram interface object and receiving said data from said interprogram interface object by said second executable program.

4. The information processing method as set forth in claim 2, further comprising:
   if an output request is received from a called executable program, generating output XML data by using data blocks held in said form item storing object; and
   outputting said output XML data to said apparatus that displayed said form screen.

5. The information processing method as set forth in claim 1, further comprising:
   receiving data blocks inputted or selected for said form screen from an apparatus that displayed said form screen, and generating said XML data including said data inputted or selected for said form screen and corresponding tags.

6. The information processing method as set forth in claim 1, further comprising:
   if the specified executable program does not exist, generating and outputting error information.

7. The information processing method as set forth in claim 1, wherein each of the called executable programs is configured so as to complete a processing for the entire form relating to said form screen by a processing executed by the called executable programs without a defining a processing sequence.

8. A non-transitory storage medium storing a program for causing a computer to execute a process comprising :
   obtaining XML data including data blocks inputted or selected for a form screen and tags each of which corresponds to one of said data blocks inputted or selected for said form screen,
   specifying executable programs each of which corresponds to one of said tags included in said XML data and carries out a processing for a corresponding data block included in said data blocks
   specifying a pre-processing program, a post-processing program, and a form processing program that correspond to a form of said form screen and carrying out a processing relating to said form of said form screen; and
   calling the specified programs among a plurality of programs that are prepared in advance and are loaded on a memory.

9. An information processing apparatus, comprising:
   a memory;
   a processor coupled to the memory, wherein the processor is configured to execute a procedure comprising;
   obtaining XML data including data blocks inputted or selected for a form screen and each of which corresponds to one of said data blocks inputted or selected for said form screen;
   specifying executable programs each of which corresponds to one of said tags included in said XML data and carries out a processing for a corresponding data block included in said data blocks;
   specifying a pre-processing program, a post-processing program, and a form processing program that correspond to a form of said form screen and carrying out a processing relating to said form of said form screen; and
   calling the specified programs among a plurality of programs that are prepared in advance and are loaded on said memory.

* * * * *